US012714038B2

(12) United States Patent
Chen et al.

(10) Patent No.: US 12,714,038 B2
(45) Date of Patent: Aug. 25, 2026

(54) MOBILE HYDROGEN-OXYGEN BURNER RAINMAKING DEVICE

(71) Applicants: Shih-Hsiung Chen, Tainan City (TW); Shu-Hsia Chang Chien, Kaohsiung City (TW)

(72) Inventors: Shih-Hsiung Chen, Tainan City (TW); Shu-Hsia Chang Chien, Kaohsiung City (TW)

( * ) Notice: Subject to any disclaimer, the term of this patent is extended or adjusted under 35 U.S.C. 154(b) by 518 days.

(21) Appl. No.: 18/094,514

(22) Filed: Jan. 9, 2023

(65) Prior Publication Data

US 2023/0217868 A1 Jul. 13, 2023

(30) Foreign Application Priority Data

Jan. 10, 2022 (TW) ................................ 111200298

(51) Int. Cl.
*A01G 15/00* (2006.01)
*F23D 99/00* (2010.01)

(52) U.S. Cl.
CPC ............ *A01G 15/00* (2013.01); *F23D 99/002* (2025.08)

(58) Field of Classification Search
CPC .............................. A01G 15/00; F23D 99/002
USPC ................................ 239/2.1, 14.1, 135, 136
See application file for complete search history.

(56) References Cited

U.S. PATENT DOCUMENTS

| | | | | |
|---|---|---|---|---|
| 2,993,648 A * | 7/1961 | Blackwell | F42B 12/50 239/14.1 |
| 3,969,842 A * | 7/1976 | Velie | A01G 13/065 239/14.1 |
| 2021/0153442 A1 | 5/2021 | MacDougall | |

FOREIGN PATENT DOCUMENTS

| | | |
|---|---|---|
| CN | 2686312 Y | 3/2005 |
| CN | 101726219 A | 6/2010 |
| CN | 109006088 A | 12/2018 |
| RU | 2003130398 A | 5/2005 |
| RU | 2283580 C2 | 9/2006 |
| RU | 2619980 C1 | 5/2017 |
| TW | M628577 U | 6/2022 |

OTHER PUBLICATIONS

Office Action dated Oct. 16, 2024 of the corresponding EGYPT patent application No. EG/P/2023/38.

(Continued)

*Primary Examiner* — Steven J Ganey
(74) *Attorney, Agent, or Firm* — HDLS IPR SERVICES; Chun-Ming Shih

(57) ABSTRACT

A mobile hydrogen-oxygen burner rainmaking device includes a container, two liquid storage barrels, a combustion chamber and an igniter. The container has an accommodating space and a gas pipe. The liquid storage barrel is disposed in the accommodating space and connected to a nozzle and filled with liquid hydrogen and liquid oxygen separately. The combustion chamber is disposed in the accommodating space and has an opening. The igniter is installed in the combustion chamber. Each nozzle sprays the liquid hydrogen and liquid oxygen in a mist form into the combustion chamber for mixing, and the igniter ignites for combustion to form a high-temperature and high-pressure water vapor to be discharged from the opening along the gas pipe, so that the rainmaking device may be transported by a container truck to an appropriate location for operation to achieve the desirable rainmaking effect.

12 Claims, 3 Drawing Sheets

(56) References Cited

OTHER PUBLICATIONS

Office Action dated Apr. 16, 2024 of the corresponding Saudi patent application No. 123441023.

* cited by examiner

MOBILE HYDROGEN-OXYGEN BURNER RAINMAKING DEVICE

BACKGROUND OF THE DISCLOSURE

Technical Field

The technical field relates to a rainmaking device, and more particularly relates to a mobile hydrogen-oxygen burner rainmaking device.

Description of Related Art

Water resource is one of the indispensable resources in life. The main water resources are stored in reservoirs after rainfall, and a small portion of the water resources is obtained by seawater desalination or other methods. However, as the demand of water used for agriculture, industry and household is constantly increasing, the long-term siltation of reservoirs has resulted in a decrease of water storage capacity of the reservoirs, and the rainfall is unstable or the high-temperature exhaust gas produced by the industry has caused insufficient rainfall, and thus the access to water resources becomes increasingly difficult, and artificial rainmaking is introduced.

A related-art rainmaking method is to send a catalyst (hygroscopic powder, such as sodium chloride, silver iodide, etc.) into the sky by an anti-aircraft gun or firework to change the nature, size, and distribution of clouds to produce raindrops. However, this rainmaking method cannot be used continuously, and the smoke produced by gunpowder not only causes environmental pollution, but also affects the formation of raindrops. Therefore, how to make rains in a programmed manner while reducing environmental pollution is an important issue that needs to be improved.

In view of the aforementioned drawbacks, the discloser proposed this disclosure based on his expert knowledge and elaborated researches to overcome the drawbacks of the related art.

SUMMARY OF THE DISCLOSURE

The primary objective of this disclosure is to provide a rainmaking device that may be transported by a container truck to an appropriate location for operation to achieve the desirable rainmaking effect To achieve the aforementioned and other objectives, this disclosure discloses a mobile hydrogen-oxygen burner rainmaking device, including a container, two liquid storage barrels, a combustion chamber, and an igniter. The container has an accommodating space and a gas pipe communicating with the accommodating space. The two liquid storage barrels are disposed in the accommodating space, and each liquid storage barrel is connected to at least one nozzle, and one of the liquid storage barrels is filled with liquid hydrogen, and the other liquid storage barrel is filled with liquid oxygen. The combustion chamber is disposed in the accommodating space and has an opening, and each nozzle penetrates into the combustion chamber. The igniter is installed in the combustion chamber, and each of the nozzles sprays the liquid hydrogen and liquid oxygen in a mist form into the combustion chamber for mixing, and then the igniter ignites for combustion, so as to form a high-temperature and high-pressure water vapor to be discharged along the gas pipe from the opening.

This disclosure has the following effects: Each liquid storage barrel supplies liquid hydrogen and liquid oxygen for combustion for a long time, thereby continuously producing high-temperature and high-pressure water vapor to the sky. Through the rocket nozzle, the high-temperature and high-pressure water vapor is sprayed toward the gas pipe at supersonic speed, and discharged along the gas pipe into the sky. By the rocket nozzle with a tapered structure, the high-temperature and high-pressure water vapor is accelerated to supersonic speed, so that the high-temperature and high-pressure water vapor may be guided upward along the gas pipe and discharged into the sky.

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
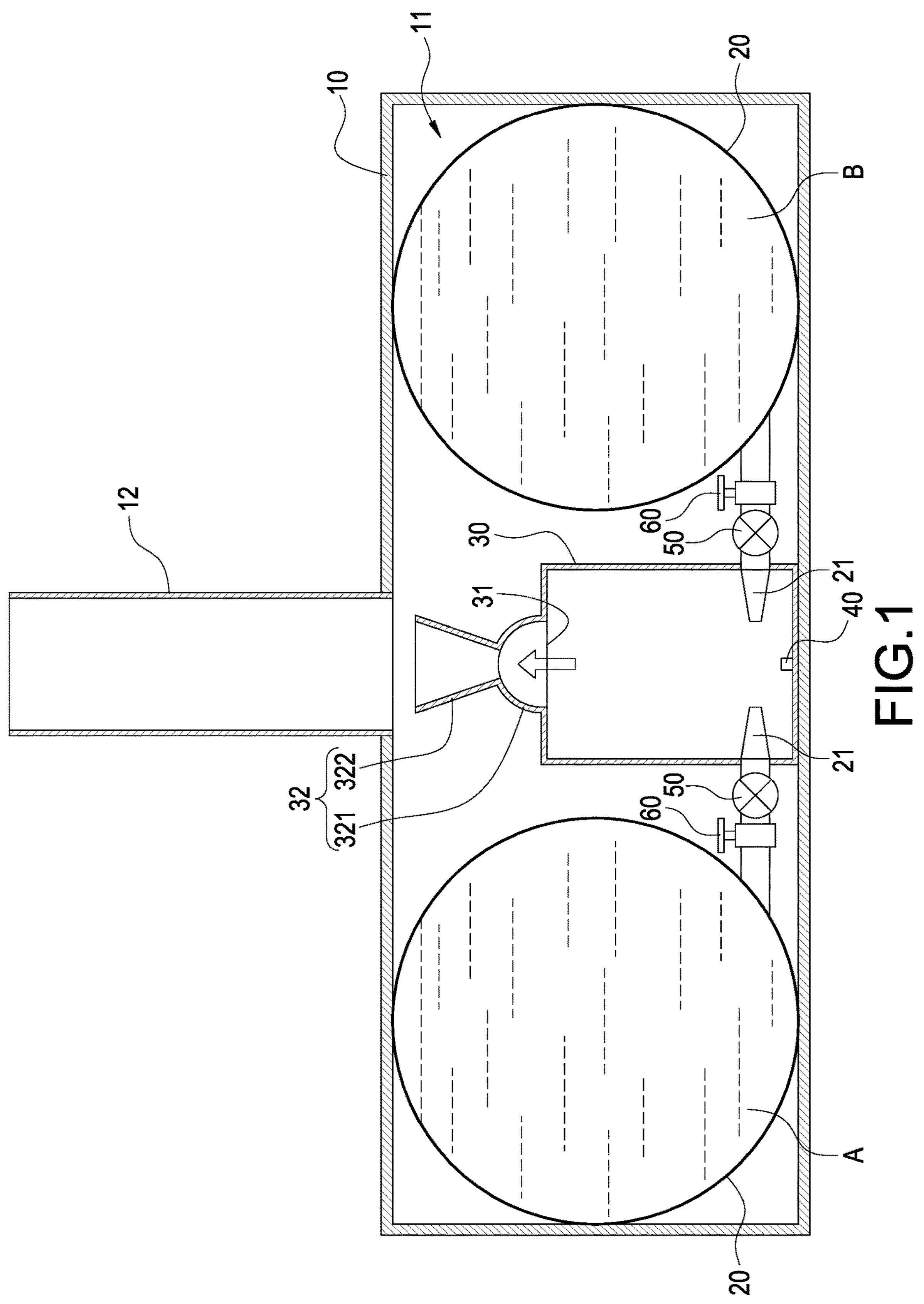
FIG. 1 is a cross-sectional side view of this disclosure.
Figure 2:
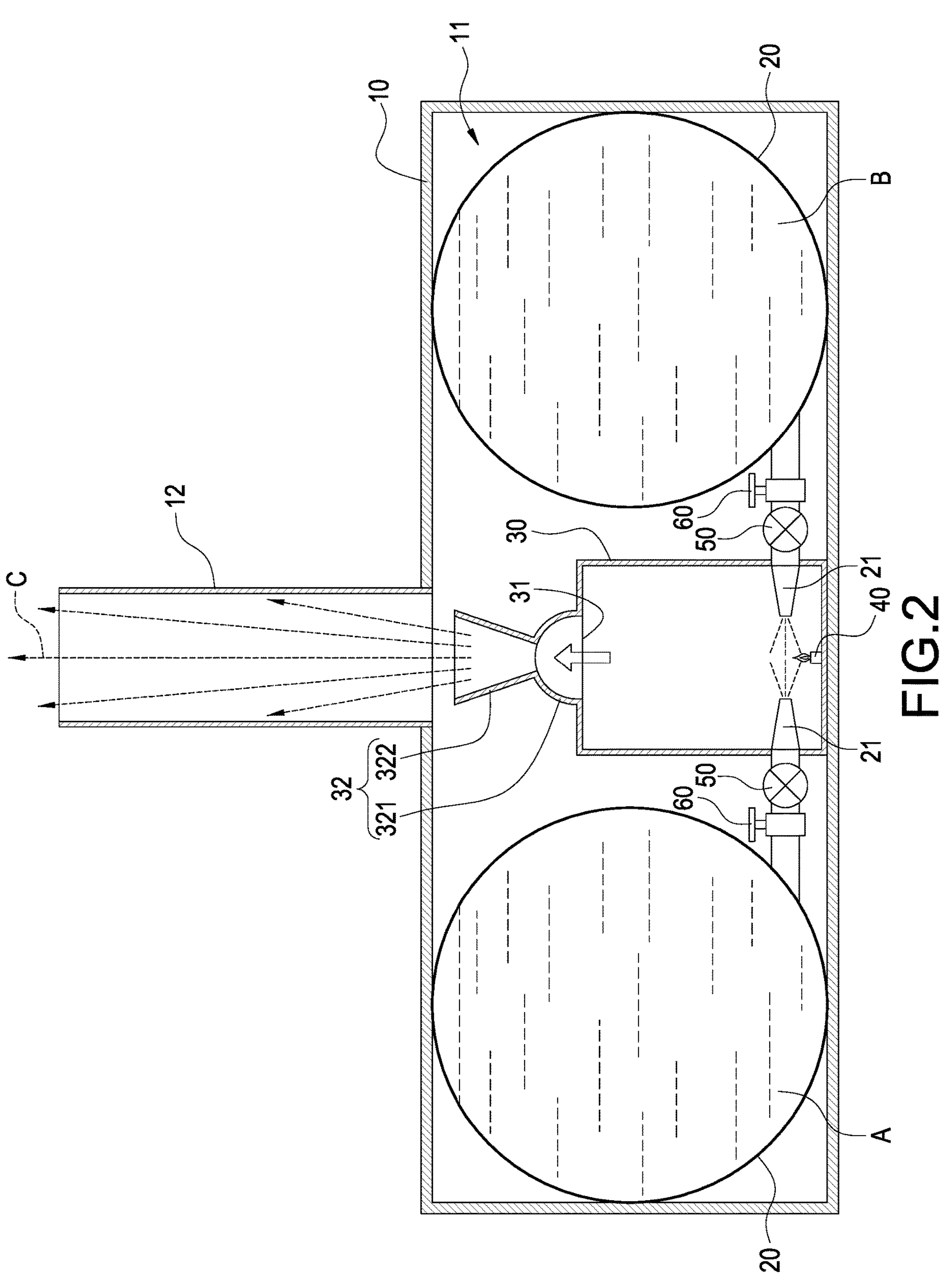
FIG. 2 is a cross-sectional side view showing a using status of this disclosure.

With reference to FIGS. 1 and 2 for a mobile hydrogen-oxygen burner rainmaking device of this disclosure, the mobile hydrogen-oxygen burner rainmaking device includes a container (such as an intermodal container or a shipping container) 10, two liquid storage barrels 20, a combustion chamber 30 and an igniter 40.

In this embodiment, the container 10 is a standard shipping container. This disclosure is not limited to such arrangement only, and designers may design the container 10 with any shape and size according to actual needs, as far as the container achieves the convenient loading and transporting effects. In other words, the shape and size of the container 10 of this disclosure are not limitation to the disclosure. The container 10 has an accommodating space 11 and a gas pipe 12 communicating with the accommodating space 11, and the container 10 has the advantages of easy access, firm structure, convenient transportation, etc.

The two liquid storage barrels 20 are disposed in the accommodating space 11, and each liquid storage barrel 20 is connected to at least one nozzle 21. In this embodiment, each liquid storage barrel 20 has one nozzle 21, but this disclosure is not limited to such arrangement only. For example, each liquid storage barrel 20 may have a plurality of nozzles 21, and designers may make adjustments according to different requirements. One of the liquid storage barrels 20 is filled with liquid hydrogen A, and the other liquid storage barrel 20 is filled with liquid oxygen B. Comparing with gaseous hydrogen and gaseous oxygen, more liquid hydrogen A and liquid oxygen B may be filled into each liquid storage barrel 20, and the liquid hydrogen A and liquid oxygen B are safer than the gaseous hydrogen and gaseous oxygen. It is noteworthy that the use of liquid hydrogen A and liquid oxygen B is only one embodiment, and high-pressure hydrogen and high-pressure oxygen may be used in other embodiments. The disclosure is not limited to liquid hydrogen A and liquid oxygen B.

In this embodiment, the combustion chamber 30 is disposed in the accommodating space 11 and between the two liquid storage barrels 20. The combustion chamber 30 has an opening 31 formed at the top of the combustion chamber 30, and each nozzle 21 penetrates into the combustion chamber 30 and is provided for spraying the liquid hydrogen A and the liquid oxygen B in the mist form contained separately in each liquid storage barrel 20 into the combustion chamber 30. The igniter 40 is installed inside the combustion chamber 30. In this embodiment, the igniter 40 is installed on the bottom of the combustion chamber 30.

In some embodiments, the mobile hydrogen-oxygen burner rainmaking device further includes two pumps 50 and two control valves 60. The quantity of the pumps 50 and the control valves 60 is corresponding to the quantity of the liquid storage barrels 20, and thus designers may adjust the quantity according to different requirements, and this disclosure has no specific limitation to the quantity. Two ends of each pump 50 communicate with the liquid storage barrel 20 and the nozzle 21 respectively. Each control valve 60 is disposed between the liquid storage barrel 20 and the pump 50, and is provided for controlling the communication and closure between each liquid storage barrel and each pump. In this way, each pump 50 may effectively pump the liquid hydrogen A and liquid oxygen B from the liquid storage barrels 20, and then spray them into the combustion chamber 30 through each nozzle 21.

With reference to FIG. 2 for a using status of this disclosure, a container truck (not shown in the figures) is provided to transport the container 10 to an appropriate location for use, and each nozzle 21 sprays the liquid hydrogen A and liquid oxygen B in a mist form into the combustion chamber 30 for mixing, and then the igniter 40 ignites for combustion, so as to form a high-temperature and high-pressure water vapor C which enters into the rocket nozzle 32 from the opening 31 and is sprayed out from the combustion chamber 30, and then the high-temperature and high-pressure water vapor C is discharged along the gas pipe 12 to the sky. In this way, the low-temperature water vapor in the high-altitude clouds may collide with the high-temperature and high-pressure water vapor C, and the cold and heat exchanging are generated by temperature difference to form larger raindrops. The raindrops attract surrounding water vapor to increase their own volume and weight to form rainfall when the weight is greater than the buoyance, and release latent heat to heat up the surrounding air and increase the upward convection force, so as to form a chain reaction until all the nearby cumulonimbus clouds are turned into rainwater. Moreover, each liquid storage barrel 20 may supply liquid hydrogen A and liquid oxygen B for mixing and combustion for a long time, thereby continuously producing the high-temperature and high-pressure water vapor C to the sky.

Further, the position of the opening 31 at the top of the combustion chamber 30 is extended and formed with a rocket nozzle 32. The rocket nozzle 32 is composed of a curved convergent structure 321 and a conical divergent structure 322 connected to the curved convergent structure 321, and the conical divergent structure 322 is tapered along a direction from the gas pipe 12 to the curved convergent structure 321. The surface of the curved convergent structure 321 and the surface of the conical divergent structure 322 are formed smoothly, so that the high-temperature and high-pressure water vapor C formed by the combustion in the combustion chamber 30 may be accelerated to the supersonic speed through the rocket nozzle 32 and then sprayed out toward the gas pipe 12, and then discharged along the gas pipe 12 into the sky.

Figure 3:
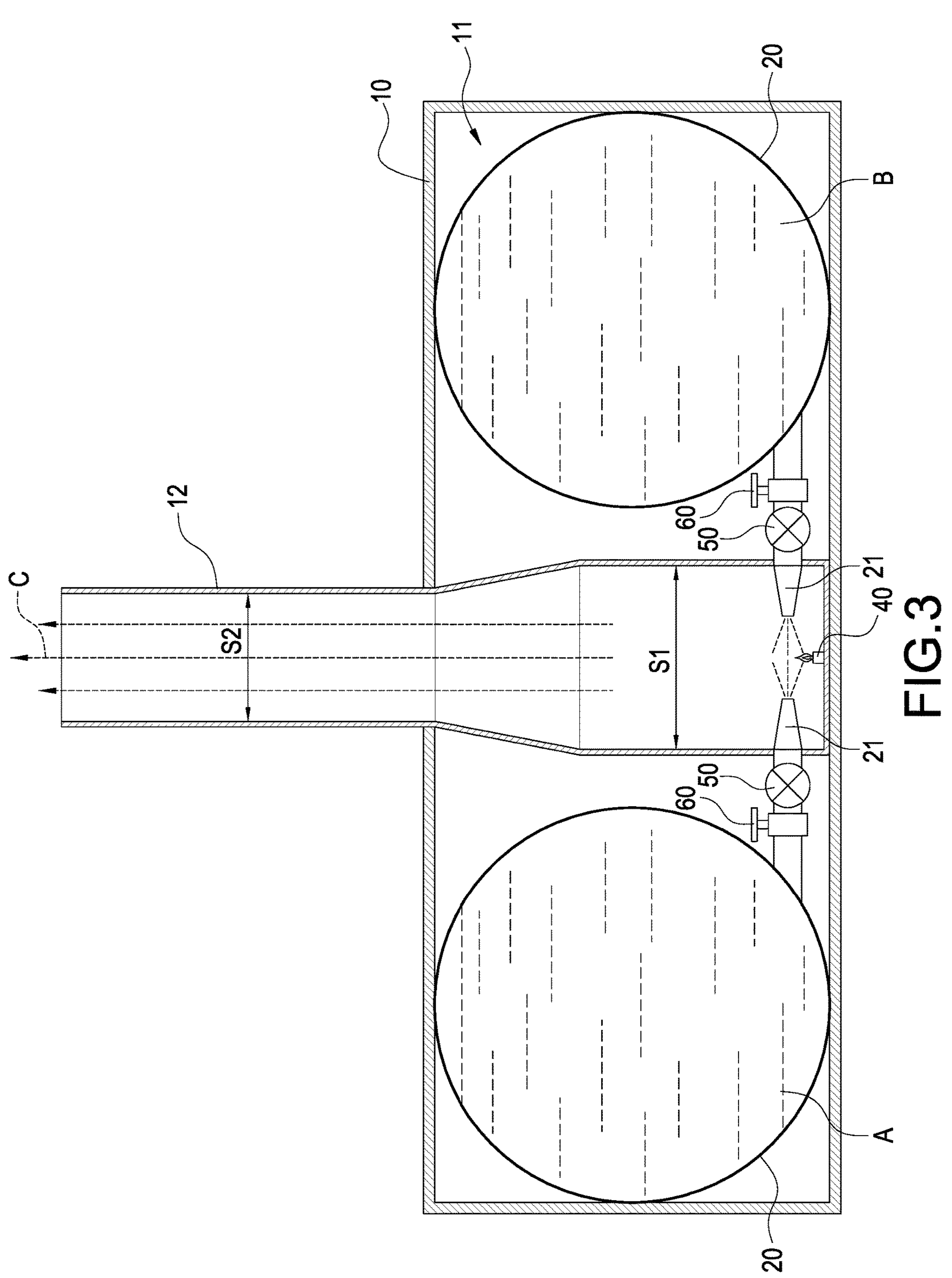
FIG. 3 is a cross-sectional side view of another embodiment of this disclosure.

With reference to FIG. 3 for another embodiment of this disclosure, the main difference of this embodiment with the previous embodiment is that the combustion chamber 30 is directly connected to the gas pipe 12, and a sectional width s1 of the combustion chamber 30 is greater than the sectional width s2 of the gas pipe 12, such that the high-temperature and high-pressure water vapor C produced by the combustion is discharged from the larger combustion chamber 30 into the smaller gas pipe 12, so as to achieve further acceleration. As a result, the high-temperature and high-pressure water vapor C may be discharged upwardly along the gas pipe 12 to the sky.

In summation of the description above, this disclosure can surely achieve the expected objectives and overcome the drawbacks of the prior art. While this disclosure has been described by means of specific embodiments, numerous modifications and variations could be made thereto by those skilled in the art without departing from the scope and spirit of this disclosure set forth in the claims.

What is claimed is:

1. A mobile hydrogen-oxygen burner rainmaking device, comprising:

a container, comprising an accommodating space defined therein, and a gas pipe communicating with the accommodating space;

two liquid storage barrels, disposed in the accommodating space, and each liquid storage barrel comprising at least one nozzle, wherein one of the liquid storage barrels is filled with a liquid hydrogen, and another one of the liquid storage barrels is filled with a liquid oxygen;

a combustion chamber, disposed in the accommodating space, and comprising an opening, and the at least one nozzle of each liquid storage barrel penetrating into the combustion chamber; and an igniter, installed in the combustion chamber;

wherein the at least one nozzle of each liquid storage barrel is configured to spray the liquid hydrogen and the liquid oxygen in a mist form into the combustion chamber for mixing, and the igniter is configured to ignite for combustion to form a high-temperature and high-pressure water vapor to be discharged along the gas pipe from the opening.

2. The mobile hydrogen-oxygen burner rainmaking device according to claim 1, wherein the combustion chamber comprises a rocket nozzle extended from the opening.

3. The mobile hydrogen-oxygen burner rainmaking device according to claim 2, wherein the rocket nozzle comprises a curved convergent structure and a conical divergent structure coupled to the curved convergent structure, and the conical divergent structure is extended and tapered along a direction from the gas pipe to the curved convergent structure.

4. The mobile hydrogen-oxygen burner rainmaking device according to claim 1, further comprising two pumps arranged corresponding to the two liquid storage barrels respectively, and two ends of each pump communicating with each liquid storage barrel and the at least one nozzle respectively.

5. The mobile hydrogen-oxygen burner rainmaking device according to claim 4, further comprising two control valves, each control valve installed between each liquid storage barrel and each pump, and configured to control communication or closure between each liquid storage barrel and each pump.

6. The mobile hydrogen-oxygen burner rainmaking device according to claim 1, further comprising two control valves, each control valve installed between each liquid storage barrel and the at least one nozzle, and configured to control communication or closure between each liquid storage barrel and the at least one nozzle.

7. A mobile hydrogen-oxygen burner rainmaking device, comprising:

a container, comprising an accommodating space defined therein, and a gas pipe communicating with the accommodating space;

two liquid storage barrels, disposed in the accommodating space, and each liquid storage barrel comprising at least one nozzle, wherein one of the liquid storage barrels is filled with a liquid hydrogen, and another one of the liquid storage barrels is filled with a liquid oxygen;

a combustion chamber, disposed in the accommodating space, and the at least one nozzle of each liquid storage barrel penetrating into the combustion chamber; and an igniter, installed in the combustion chamber;

wherein, the at least one nozzle of each liquid storage barrel is configured to spray the liquid hydrogen and the liquid oxygen in a mist form into the combustion chamber for mixing, and the igniter is configured to ignite for combustion to form a high-temperature and high-pressure water vapor to be discharged along the gas pipe.

8. The mobile hydrogen-oxygen burner rainmaking device according to claim 7, wherein the combustion chamber is coupled to the gas pipe.

9. The mobile hydrogen-oxygen burner rainmaking device according to claim 8, wherein a sectional width of the combustion chamber is greater than a sectional width of the gas pipe.

10. The mobile hydrogen-oxygen burner rainmaking device according to claim 9, further comprising two pumps, arranged corresponding to the two liquid storage barrels respectively, and two ends of each pump communicating with each liquid storage barrel and the at least one nozzle respectively.

11. The mobile hydrogen-oxygen burner rainmaking device according to claim 10, further comprising two control valves, each control valve installed between each liquid storage barrel and each pump, and configured to control communication or closure between each liquid storage barrel and each pump.

12. The mobile hydrogen-oxygen burner rainmaking device according to claim 9, further comprising two control valves, each control valve installed between each liquid storage barrel and the at least one nozzle, and configured to control communication or closure between each liquid storage barrel and the at least one nozzle.

* * * * *